Feb. 10, 1959

R. O. LEWIS, JR 2,873,335

VARIABLE RESISTANCE CIRCUIT CONTROLLER

Filed May 14, 1954

INVENTOR.
ROBERT O. LEWIS, JR.
BY
Schley, Trask & Jenkins
ATTORNEYS.

United States Patent Office 2,873,335 Patented Feb. 10, 1959

2,873,335

VARIABLE RESISTANCE CIRCUIT CONTROLLER

Robert O. Lewis, Jr., Indianapolis, Ind.

Application May 14, 1954, Serial No. 429,958

4 Claims. (Cl. 201—51)

This invention is to prevent the generation of radio noise by electrical apparatus operated in proximity to radio quipment, especially in aircraft, for example, by electrical signalling and warning apparatus such as that for operating the position-indicating or running lights carried at the wing tips and tail of an aircraft. The invention relates particularly to a circuit controller adapted to perform a cyclic switching function without creating radio noise, and to the combination of that controller in a signalling circuit.

A number of situations exist in which the operation of radio equipment is subject to interference from electrical disturbances produced by the operation of other electrical apparatus located in more or less close proximity to the radio equipment. Such interference is referred to as radio noise, and may result, for example, from the rapid excitation of electrical circuits in such other electrical apparatus and the consequent generation of radio-frequency radiation, from the arcing of switches controlling such other electrical apparatus, etc. The problem is especially troublesome in aircraft, which to an increasing extent carry various electrical apparatus in unavoidable proximity to the radio equipment. It is particularly troublesome when the other electrical apparatus is operated cyclically, for a rapid cyclic radio noise then occurs. The flashing of position-indicating wing and tail lights of aircraft have heretofore been controlled by cyclically operated switches, opened and closed at a rate of the order of 40 cycles per minute, and while much effort has been made to provide filters and shielding to suppress the radio noise resulting from the operation of these light circuits, such suppression has not been complete, and has required relatively bulky and heavy filtering and shielding equipment.

It is the object of my invention to provide a circuit controller which performs a switching function at a sufficiently rapid controlled rate to be suitable for controlling such circuits as those of the position-indicating lights of aircraft, and which avoids the creation of radio noise and thus eliminates the necessity for heavy and bulky filters. It is a further object of the invention to provide a radio-noise-free signalling system containing such a circuit controller in combination therewith. It is a further object of the invention to provide combined circuit-controlling apparatus in which a plurality of signal devices are operated in related cycles of operation.

In accordance with the invention, the circuit controller comprises a carbon pile, preferably a stack of carbon disks, compressed by two substantially independent forces, preferably spring forces. One force maintains a minimum or pile-preserving pressure on the carbon pile to insure that the several carbon elements are held in firm contact under all conditions, both to prevent creation of radio noise by arcing between the carbon elements and to avoid deterioration of the carbon pile as a result of separation of the carbon elements. The second force applies a predetermined high or maximum pressure to the carbon pile, to reduce its resistance and reduce the voltage drop across it, so that in effect it closes the circuit which it controls. The carbon pile is normally under this maximum pressure, and mechanical means is provided which is operable at desired or predetermined times to withdraw the maximum pressure from the pile and transfer the pressure-applying force to an independent support, and thus to put the pile under its low pile-preserving pressure under which it has high resistance and in effect opens the controlled circuit.

In a cyclically operable light-flasher system, the maximum pressure is periodically withdrawn from the controlling pile in a predetermined cycle of operations, as by a cam driven continuously by a suitable motor, and the cam shape is made to give the desired cycle of operations. The circuit controller is connected in series with the lamp or other signalling device in a circuit connected to a suitable power source. When the maximum pressure is applied to the carbon pile, its resistance drops to a low value and it transmits substantially the full power of the power source to the filament of the lamp, to bring it to incandescence for emission of its intended signal. When the maximum pressure is withdrawn and the carbon pile is under only the minimum pressure, the resistance of the carbon pile rises and blocks the transmission of all but a small amount of power to the lamp. Such small amount of power is insufficient to cause incandescence and in effect the lamp is extinguished, although its filament may, and desirably does, remain hot, as at a dull-red heat below the point of signal emission.

The rate at which the maximum pressure is applied to and withdrawn from the carbon pile is desirably controlled as by suitably shaping the rise and fall of the actuating cam, and the rate at which the controlled circuit is excited (on and off) is accordingly controlled to a rate less than that which will cause the circuit to generate radio-noise. The rate of circuit excitation may be correlated with the heating- and cooling-rate characteristics of the lamp filament and the consequent resistance rise and fall of the filament, so avoid the current surges which occur in switch-controlled circuits and which tend to produce radio noise. The rate of circuit excitation is nevertheless sufficiently rapid to adapt the controller for operation of cyclic signals such as the position-indicating or running lights of an aircraft, various flasher-warning lights, identification-signal devices, etc. The controller can be used both in A. C. and in D. C. circuits.

The accompanying drawing illustrates the invention. In such drawings.

Figures 1, 2, 3, 4:
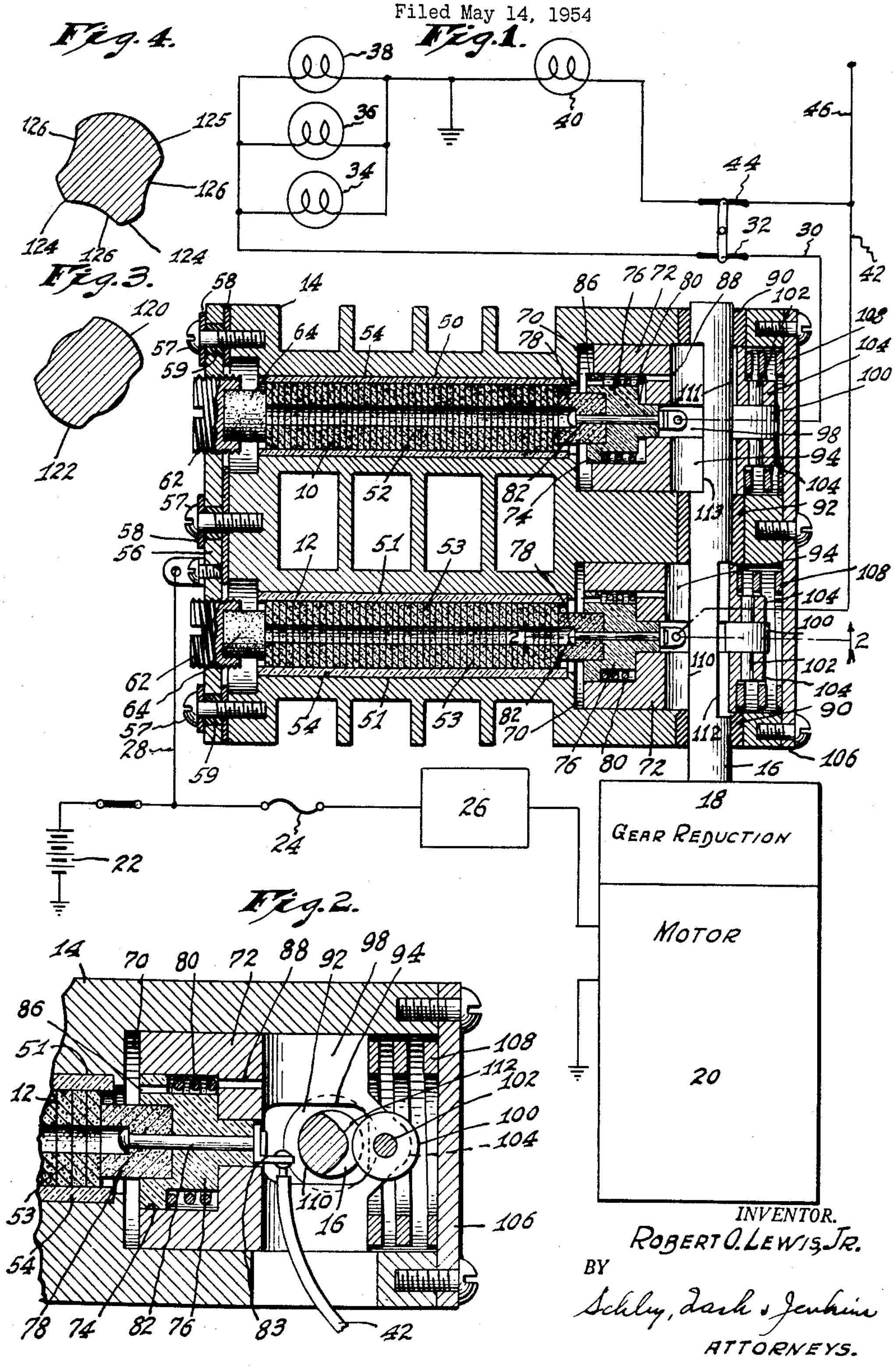
Fig. 1 is a combined circuit diagram and sectional view, showing in section a circuit controller embodying my invention and showing in diagram a circuit for the position-indicating lights of an aircraft with that circuit controlled by the circuit controller.
Fig. 2 is a sectional view of the pile pressure mechanism of Fig. 1, taken on the line 2—2 of Fig. 1.
Figs. 3 and 4 are sectional views showing differently shaped cams for producing different cycles of operation.

The circuit controller shown in Fig. 1 comprises two parallel circuit controllers 10 and 12 housed in a common casing 14 and operating from a common cam shaft 16 driven at say 40 R. P. M. through a gear reduction 18 from a high-speed motor 20. A power supply 22, one side of which is grounded, is connected to the motor 20 through a fuse 24 and a small filter 26 adapted to suppress any noise from the commutator of the motor. The power supply, here shown as a D. C. supply, is also connected by a wire 28 to both of the circuit controllers 10 and 12 in parallel. The opposite terminal of the controller 10 is connected by a wire 30 through a switch 32 to one side of a group of three lamps 34, 36, and 38. The lamps 34 and 36 represent the wing-tip lights of the aircraft. The lamp 38 represents the tail light which is flashed concurrently with the wing-tip lights 34 and 36 and alternately with a second light at the tail of the aircraft. The second tail light is represented by the lamp 40, which is controlled by a second controller 12, being connected to it by a wire 42 through a switch 44. The opposite sides of the several lamps are grounded.

One or both of the controlled circuits may be utilized to flash other indicating lights or signals in the aircraft, for example, to flash warning lights on the instrument panel of the aircraft to indicate some danger or mal-function, such as the fact that a fuel tank is running low, that the landing wheels are not in their proper position, etc., Such warning signals can be operated from either or both circuits, and as shown the circuit for the tail light 40 is provided with a lead 46 connected ahead of the switch 44, to supply a warning light which is to operate whether or not the wing-tip and tail lights are operative. The switches 32 and 44 permit the running lights to be turned off when not needed, and are desirably arranged for joint operation.

The common housing 14 for the two controllers 10 and 12 may be a lightweight die casting formed to provide two bores 50 and 51 to house two stacks of carbon disks 52 and 53. Each bore 50 and 51 is lined with a sleeve 54 of suitable insulating material, such as glass or ceramic. The left end of the housing 14 is provided with an end plate 56 held in place by screws 57 but insulated from the housing 14 by suitable layers 58 and sleeves 59 of insulation. Opposite each of the two bores 50 and 51, the end plate 56 carries an adjustable abutment screw 62 provided with a carbon-contact block 64, to engage and support the left-hand end of each carbon pile 52 and 53.

At the right-hand end of the casing 14, each bore 50 and 51 is provided with an enlargement 70 to slidably receive a high-pressure block 72. The block 72 is provided with a shouldered bore 74 in which is mounted a slidable low-pressure block 76 which carries a carbon contactor 78 in engagement with the right-hand end of the opposite carbon pile 52 or 53. The low-pressure blocks 76 are spring pressed toward the piles by light springs 80, reacting against the blocks 76 and adapted to continuously maintain on the piles a minimum pressure, of say five ounces, sufficient to maintain the carbon disks in firm contact under all conditions.

The high-pressure blocks 72 may be of metal to provide adequate strength. The low-pressure blocks 76 are made of non-conducting material, as of molded plastic; and to provide a terminal at this end of each pile, the contactors 78 are connected by axial rivets 82 to external connectors 83 for the wires 30 and 42.

Since the blocks 72 have a substantial amount of movement axially in the bores 70 during operation of the controllers, the bores 70 are desirably vented, to prevent air-pressure changes from interfering with the desired operation. To this end, the flange of each low-pressure block 76 is provided with a hole 86, and each high-pressure block 72 is provided with a vent hole 88.

The cam shaft 16 is journalled in the housing 14 in outer bearings 90 and a central bearing 92, with its axis intersecting the axes of the bores 50 and 51. The high-pressure blocks 72 are each provided with a transverse opening 94 to freely pass that cam shaft 16. Each block 72 is also provided with a slot 98 at right angles to the axis of the cam shaft 16, in which a cam-follower roller 100 is mounted on a pin 102 fixed in bosses 104 at the outer end of the block 72. The outer end of the casing is closed by an end plate 106, and a heavy spring 108 is interposed between this end plate 106 and each pressure block 72.

The cam shaft 16 is conveniently formed as a straight cylindrical shaft with suitable cam reliefs cut into its cylindrical surface. As shown in Fig. 2, the cam for the controller 12 of Fig. 1 is formed with a land 110 extending about 180° about the surface of the shaft 16, and with a relief 112 in the opposite half of the cam shaft. The cam rise at the leading end of the land 110 and the cam drop at the trailing end of the land 110 are shaped to give the desired rates of rise and fall of the high-pressure follower block 72. The cam for the controller 10 has a similar land 111 and relief 113, which are disposed oppositely from the land 110 and relief 112 so that the blocks 72 for the two piles 52 and 53 are lifted alternately as the cam shaft is rotated.

In the position of the parts as shown in Fig. 1, the cam-following roller 100 for the controller 10 is supported by the cam land 111 in raised position, and the high-pressure block 72 is retracted from the pile 52, the entire force of the heavy spring 108 being carried by the cam, with no force from that spring applied to the carbon pile 52. The low-pressure block 76 thus exerts the only pressure on the carbon pile 52, and the pile is under the minimum pressure developed by the low-pressure spring 80. The pile 52 thus has high resistance, and the lamps 32, 34, and 36 controlled thereby are effectively extinguished. The carbon pile 53 of the controller 12, however, is under maximum pressure, for its cam-following roller 100 lies free in the cam relief 112, and its high-pressure block 72 has moved against its low-pressure block 76, and the full pressure of its main spring 108 is exerted through these blocks and the contact block 78 onto the pile 53. The pile 53 thus offers low resistance to the current in its circuit, and the lamp 40 is lighted.

As the shaft 16 is rotated, each cam alternately transfers between itself and its pile the full force of the high-pressure spring. Since the two cams are oppositely disposed, the two high-pressure follower blocks 72 are alternately raised and lowered, and the two carbon piles 52 and 53 are alternately put under the maximum pressure, and relieved of that maximum pressure and held under the minimum pressure.

A carbon pile having a nominal length of the order of 2 inches changes in length by .015 to .020 inch as the high and low pressures are alternately effective on it. Accordingly, the cam throw must be sufficient to retract the high-pressure block by a minimum of .015 to .020 inch. I provide additional movement to ensure complete relief of the pile from the high-pressure spring force and unrestricted application of that force, and to allow for wear and adjustment and for any lost motion resulting from bearing and roller clearance. Accordingly, the cam throw is desirably of the order of .050 inch as a minimum. It may be noted that in the event of excessive wear or of breakage of the cam shaft, the heavy pressure would fail to be withdrawn from the carbon pile and the pile would remain under low-resistance-producing compression. This would result in continuous illumination of the lamps which would then serve as continuous instead of flashing-signal lights.

In the device of Figs. 1 and 2, each cam land 110 and 111 extends over about 180° of the cam shaft, and with the shaft operated at 40 R. P. M., each carbon pile will be under full pressure for about .75 second and under minimum pressure for about .75 second. Since the cams are oppositely disposed, the two sets of lamps will operate in repeated cycles of .75 second "on," and .75 second "off," with each set "on" when the other is "off."

Instead of a cycle in which the lamps are on and off for equal consecutive periods, other cycles of operation can be used, as to give other signals. In Fig. 3, the cam shown has two opposite lands 120 and two intervening reliefs 122. Use of such a cam would give an on-off cycle at twice the rate given by the cam of Fig. 2, and the light would flash twice during each revolution of the cam. In Fig. 4, the cam has two short lands 124 of about 45° extent and a long land 125 of 135° extent, separated by three short reliefs 126. A lamp control actuated by such a cam would cause the lamp to emit successive groups of three short flashes, with the groups separated by a prolonged period of darkness. The system would thus repeatedly emit the Morse-code signal for the letter "S." Other cams, operating at suitable speeds, can be made to cause emission of various Morse and other code signals. The circuit controller can thus be used to transmit coded signals of various sorts, as for aircraft identification, etc.

Apparatus as shown in Fig. 1, which simulates the position-indicating lamp system used on aircraft, was operated with a 28-volt D. C. power source corresponding to that generally used on aircraft, and was found radio-noise-free, that is, to produce no radiation which caused significant noise in adjacent radio equipment. It is believed that this highly desirable characteristic of the apparatus may be explained as follows:

It is characteristic of incandescent filament lamps that the filament resistance is relatively low when the filament is cold, and increases as the filament is heated. When a switch closes a circuit to such a lamp, there is an initial surge of current through the low-resistance filament atnd the circuit, and a subsequent tapering off of the curent as a filament resistance rises. It is such surges or transients, occurring in a switch-controlled circuit, which produce radio-noise.

In a lamp circuit controlled by the controller of this application, the lamp filament never completely cools, for when the controlling carbon pile is under low pressure, and it nevertheless passes some power to the lamp. In the apparatus I have used, with a 28-volt power source, the resistance of the pile under low pressure produced a voltage drop of about 24-volts across the pile, and there remained a voltage of about 4-volts across the lamps. This produced some current flow through the lamp filament, sufficient to maintain the filament hot, at not more than a dull-red heat, and the lamp was not incandescent and in effect was extinguished. Thus, when the lamps in the circuit are effectively "off," the filament remains heated and its resistance does not drop to the same low value which would occur if the filament were completely cool. The lamp thus presents a higher than normal resistance, and when it is turned "on" in my circuit, the surge of current which would otherwise occur is proportionately reduced, and it is believed that this contributes to the elimination of radio noise. A more important factor in the elimination of that radio noise is the fact that while the lamp is in effect turned on and off instantaneously, the transfer of pressure to and from the pile occurs at controlled rates and causes the rise and fall of current flow to occur at rates substantially slower than when switches are opened and closed. The rates of current rise and fall, and especially the rate of current rise, are co-ordinated with the resistance changes resulting from the temperature changes of the lamp filament, to avoid the surges which produce radiation of radio noise. Moreover, the operation of the apparatus involves no switch-opening or switch-closing, and thus avoids all possibility of arcing and the radio noise which arcing produces.

In accordance with this explanation, the apparatus shown operates as follows: The high-pressure spring is continuously stressed, and normally exerts its force on the pile to compress it and reduce its resistance to a low value, for example, to a value which gives a voltage drop in the pile of only about 1-volt. As the rotating cam engages the cam follower, it opposes the force of the spring and withdraws the spring force from the pile and transfers that force to itself, leaving the pile under only the low pressure of the low-pressure spring. The low pressure is sufficient to maintain the disks of the pile in contact, and thus to preserve the pile against deterioration. Under the low pressure the resistance of the pile increases to a large value, sufficient to produce a voltage drop across the pile of about 24-volts. As the resistance of the pile is thus rapidly shifted at a controlled rate and in the cycle predetermined by the shape of the cam, between a low-resistance condition and a high-resistance condition, the lamp is correspondingly subject to high and low voltages and is alternately rendered incandescent and non-incandescent. The lamp emits a flashing signal in a cycle predetermined by the shape and speed of rotation of the cam which controls the pressure transfers.

Under any current application, even with an instantaneously closing switch, a lamp filament takes some time to reach full incandescence. The rate of current application in my controller, while slower than with a switch, need not prolong to any material extent the time required for the filament to reach incandescence, especially in view of the fact that the filament is already at a non-emitting hot temperature at the start of the emission-producing current application. The controller is therefore amply fast to control a flashing-signal device, and at the same time controls the current changes in a manner which avoids radio-noise-producing conditions.

I claim as my invention:

1. A circuit controller, comprising a carbon-disk pile, a contactor therefor, a thrust member for applying pile-compressive force to said contactor, means urging said member toward said contactor with a predetermined high force, means controlling the position of said member and movable between a position in which it supports said member out of pressure-applying relation with said contactor and a position in which it frees said member for exertion of said predetermined force on said contactor, and means to maintain a pile-preserving low-compression force on said contactor when said member is withdrawn.

2. A circuit controller as defined in claim 1 with the addition of means to move said controlling means between its said two positions in a predetermined cycle of repetitive operations.

3. A circuit controller as defined in claim 2 in which said controlling means comprises a cam having land and relief portions, with the addition of means to drive said cam at a predetermined rate, said cam and relief portions being proportioned to effect a predetermined cycle of high and low pressures on said pile.

4. A circuit controller as defined in claim 3 in which said cam has rise and fall portions between said land and relief portions sloped to move said member between its two positions at predetermined rates.

References Cited in the file of this patent

UNITED STATES PATENTS

| | | |
|---|---|---|
| 745,488 | Goltz | Dec. 1, 1903 |
| 777,116 | Louis | Dec. 13, 1904 |
| 1,070,629 | Ray | Aug. 19, 1913 |
| 1,089,081 | Ray | Mar. 3, 1914 |
| 1,613,337 | Weller | Jan. 4, 1927 |
| 2,192,673 | Cooper | Mar. 5, 1940 |
| 2,514,373 | Cook | July 11, 1950 |